United States Patent
Schermer et al.

(10) Patent No.: US 9,274,271 B2
(45) Date of Patent: Mar. 1, 2016

(54) RECONFIGURABLE LIQUID METAL FIBER OPTIC MIRROR

(71) Applicants: Ross Schermer, Springfield, VA (US); Carl A. Villarruel, Burke, VA (US); Frank Bucholtz, Crofton, MD (US); Colin McLaughlin, West River, MD (US)

(72) Inventors: Ross Schermer, Springfield, VA (US); Carl A. Villarruel, Burke, VA (US); Frank Bucholtz, Crofton, MD (US); Colin McLaughlin, West River, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 122 days.

(21) Appl. No.: 14/027,262

(22) Filed: Sep. 16, 2013

(65) Prior Publication Data
US 2014/0105554 A1 Apr. 17, 2014

Related U.S. Application Data

(60) Provisional application No. 61/700,958, filed on Sep. 14, 2012.

(51) Int. Cl.
*G02B 6/02* (2006.01)
*G02B 6/032* (2006.01)
*G02B 6/28* (2006.01)

(52) U.S. Cl.
CPC .......... *G02B 6/02295* (2013.01); *G02B 6/0239* (2013.01); *G02B 6/02385* (2013.01); *G02B 6/02328* (2013.01); *G02B 6/032* (2013.01); *G02B 6/2861* (2013.01); *H04B 2210/006* (2013.01)

(58) Field of Classification Search
CPC ............. G02B 6/02328; G02B 6/0239; G02B 6/02385; G02B 6/2861; G02B 6/02295; G02B 6/032; G02B 2006/0325
USPC .............................. 385/125; 65/385
See application file for complete search history.

(56) References Cited

U.S. PATENT DOCUMENTS

| 6,859,268 | B2 | 2/2005 | Chou et al. |
| 6,925,223 | B2 | 8/2005 | Wong |
| 7,003,204 | B2 | 2/2006 | Upton |
| 7,251,395 | B2 | 7/2007 | Upton |

(Continued)

OTHER PUBLICATIONS

Written Opinion of the International Search Authority and International Search Report, issued on Dec. 13, 2013, in related application PCT/US2013/059847, 10 pages.

*Primary Examiner* — Robert Tavlykaev
(74) *Attorney, Agent, or Firm* — US Naval Research Laboratory; Sally A. Ferrett (57) ABSTRACT

A true time delay system for optical signals includes a hollow core optical waveguide, a droplet of reflective liquid metal disposed in the hollow core, and an actuator coupled to a first end of the waveguide to move the droplet longitudinally within the hollow core. In one example, the waveguide is a hollow core photonic bandgap fiber. In one example, the actuator is a pressure actuator that introduces or removes gas into the core. Light enters the optical fiber, is transmitted through the fiber toward the reflective surface of the droplet, and is reflected back through the fiber and exits at the same end of the photonic bandgap optical fiber that it entered. The fiber optic device can provide a continuously-variable optical path length of over 3.6 meters (corresponding to a continuously-variable true-time delay of over 12 ns, or 120 periods at a 10 GHz modulation frequency), with negligible wavelength dependence across the C and L bands.

13 Claims, 8 Drawing Sheets

(56) References Cited

U.S. PATENT DOCUMENTS

| | | | |
|---|---|---|---|
| 8,170,384 B1* | 5/2012 | Riza | 385/27 |
| 2006/0140563 A1 | 6/2006 | Upton | |
| 2006/0140564 A1 | 6/2006 | Upton | |
| 2008/0231861 A1 | 9/2008 | Nebendahl | |
| 2010/0135608 A1 | 6/2010 | Chen | |
| 2010/0266251 A1* | 10/2010 | Lyngso | C03B 37/0122 385/125 |
| 2011/0142402 A1* | 6/2011 | Tachikura et al. | 385/96 |
| 2012/0195554 A1* | 8/2012 | Maack | G02B 6/2552 385/49 |
| 2012/0263197 A1* | 10/2012 | Koplow | G02B 6/274 372/6 |

* cited by examiner

RECONFIGURABLE LIQUID METAL FIBER OPTIC MIRROR

CROSS-REFERENCE TO RELATED APPLICATIONS

This application is a non-provisional under 35 USC 119(e) of, and claims the benefit of, U.S. Provisional Application 61/700,958 filed on Sep. 14, 2012, the entire disclosure of which is incorporated herein.

BACKGROUND OF THE INVENTION

1. Technical Field

This invention is related to photonic devices, and more particularly, to optical fiber-based time delay devices.

2. Related Technology

Optical-domain, radio-frequency (RF) true-time-delay (TTD) lines with programmable time delays, wide bandwidth and low optical loss are important components of microwave photonic signal processing systems and future optical communications networks. Their unique advantages, including low loss (independent of RF frequency), large instantaneous bandwidth, immunity to electromagnetic interference, and parallel signal processing capability, have led to the realization of high-performance, tunable microwave filters, phased array beamformers, fast analog-to-digital converters, arbitrary waveform generators, signal correlators, and frequency converters and mixers. For such applications, it is desired that the delay lines exhibit low loss, wide RF bandwidth, and minimal frequency-dependent loss and dispersion. Furthermore, the ability to continuously-tune a true time delay over many RF periods is of interest for enabling high-resolution, reconfigurable optical-domain signal processing and beamforming systems.

Figure 1:
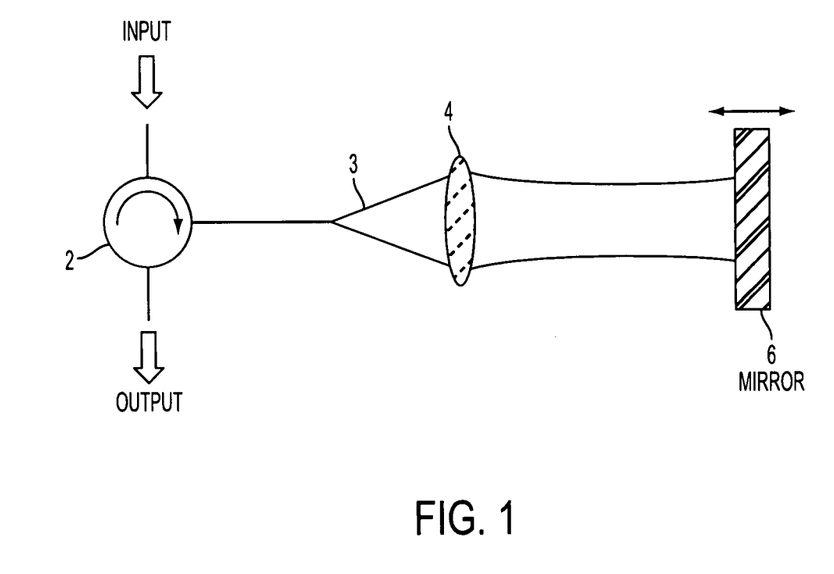
FIG. 1 is an example of a free-space optics time delay system.

True-time-delay lines have been implemented using mechanical devices for stretching the optical fibers. In other examples, fiber-optic delay line filters using chirped fiber Bragg gratings have been used. FIG. 1 shows a free space optical system for producing a time delay. An optical signal is sent through a circulator 2, exits the circulator, travels along an optical path that includes a lens 4 and a translatable mirror 6, and returns through the lens 4 and back to the optical circulator 2. Motion of the mirror 6 in a direction along the optical path can extend or shorten the signal's optical path, so that the signal experiences a time delay that can be adjusted by changing the mirror's position.

U.S. Pat. No. 7,003,204 to Upton, U.S. Pat. No. 7,521,395, U.S. Patent Publication No. 2006/0140563 to Upton, and U.S. Patent Publication No. 2006/0140564 to Upton disclose continuously variable optical delay lines with a holey fiber configured in a spiral layout, with one end of the fiber operative to a reflective fluid reservoir, and with a segmented piezoelectric actuator overlaying the spiral coiled fiber employed to position the reflective fluid within the fiber.

Optical-resonance techniques that rely on the concept of slow light also have been proposed to produce time delay effects for optical signals.

BRIEF SUMMARY

A true time delay system for optical signals includes a hollow core optical waveguide, a droplet of reflective liquid metal disposed in the hollow core of the hollow core photonic bandgap optical fiber, and a actuator. The waveguide can be a hollow core optical fiber, and can be a hollow core photonic bandgap optical fiber. The actuator can be coupled to a first end of the hollow core photonic bandgap optical fiber to introduce additional gas into the hollow core at a near side of the droplet, thereby increasing the gas pressure at the near side of the droplet and changing the position of the droplet within the hollow core. One or both ends of the hollow core photonic bandgap optical fiber is configured to receive optical energy from an optical source, to transmit the optical energy through the hollow core photonic bandgap optical fiber toward the reflective surface of the droplet, and to return the reflected optical energy toward the optical source.

The optical source can be an optical circulator, which receives optical energy from a laser. The cladding of the optical fiber has holes surrounding the hollow core that are substantially free of the reflective liquid.

The droplet can have a length along the core of the hollow core photonic bandgap optical fiber of between about two core diameters and four core diameters. The droplet can have a length along the core of the hollow core photonic bandgap optical fiber of between one core diameter and about ten core diameters. The droplet can be mercury, another reflective liquid, or another reflective liquid metal.

The pressure actuator is in contact only with the first end of the hollow core photonic bandgap optical fiber.

The system can also include a single mode fiber optically coupled between the second end of the hollow core photonic bandgap fiber and the optical circulator.

DETAILED DESCRIPTION OF EMBODIMENTS OF THE INVENTION

A continuously and widely-tunable optical-domain true time delay device is described herein which has wide RF bandwidth, immunity to electromagnetic interference, and minimal frequency-dependent loss and dispersion. The true-time-delay device has applications in high-performance, tunable microwave filters, phased array beamformers, fast analog-to-digital converters, arbitrary waveform generators, signal correlators, frequency converters and mixers, and high-resolution, reconfigurable optical-domain signal processing and beam-forming systems.

Figures 2A, 2B:
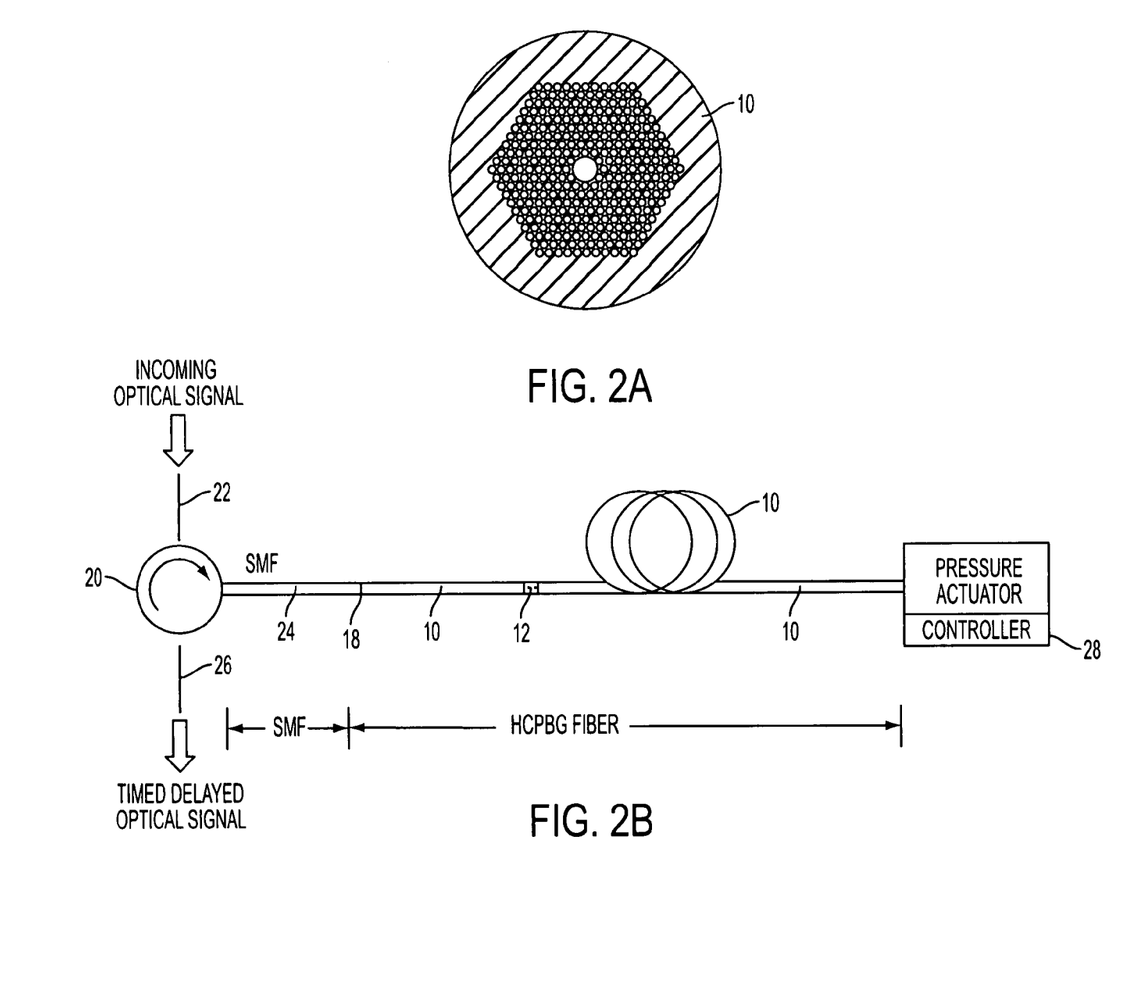
FIG. 2A is a cross sectional view of a hollow core photonic bandgap fiber used in a time delay system.
FIG. 2B shows a time delay system based on a translatable liquid metal droplet in the hollow core of an optical waveguide, which in this example is a hollow core photonic bandgap fiber.
Figure 2C:
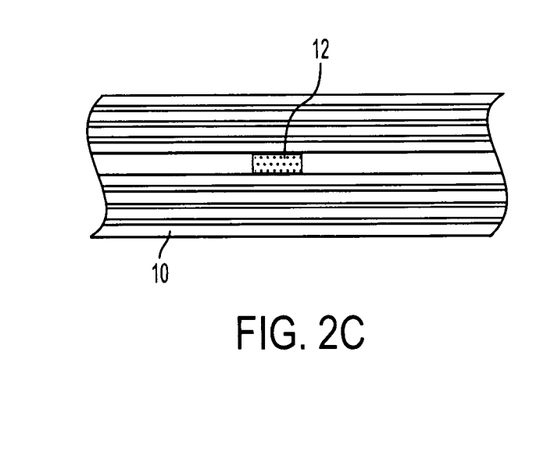
FIG. 2C shows a portion of the hollow core photonic bandgap fiber in the region of a liquid metal droplet.

FIGS. 2A, 2B, and 2C illustrate an exemplary embodiment of a true time delay system.

An optical waveguide 10, which in this example is a hollow core photonic bandgap fiber, is shown in cross section in FIG. 2A. The waveguide 10 in this example is an optical fiber with a central hollow core and a microstructure formed of an array of channels 13 surrounding the central hollow core running the length of the fiber. The channels can be air filled, filled with another gas, or evacuated. The channels preferably have a diameter less than that of the central hollow core and are configured in a plurality of rings surrounding the central hollow core. One suitable example is the HC-1550-02 hollow core photonic bandgap fiber that is available commercially from NKT Photonics Inc. The photonic bandgap optical fiber waveguide 10 guides light longitudinally along the central hollow core of the fiber.

FIG. 2B shows a time delay system in which a small droplet 12 of a reflective liquid metal is located within the central hollow core of the photonic bandgap fiber 10.

FIG. 2C shows a section of the hollow core photonic bandgap fiber 10 containing the droplet 12.

The reflective droplet 12 preferably has a small volume such that it extends only a small fraction of the entire length of the photonic bandgap fiber 10. The remaining volume within the central hollow core on either side of the droplet 12 is filled with air, with another gas that is substantially transparent at the wavelength of the light transmitted into the fiber by the optical input/output device, or evacuated.

The hollow core photonic bandgap fiber 10 has at least one end 14 that is operationally coupled to an actuator that moves the droplet longitudinally within the hollow core. In an exemplary embodiment, the actuator is a pressure actuator 16 positioned externally to the fiber 10, and the pressure actuator 16 forces pressurized gas in and out of the hollow core at the first end 14 of the fiber 10. As shown in FIG. 2B, the pressure actuator 16 is located at a far end of the hollow-core photonic bandgap fiber 10, opposite the end 18 through which light enters and leaves the hollow-core photonic bandgap fiber 10. A controller 28 controls the pressure actuator 16 to increase or decrease the gas pressure in the hollow core on the side of the reflective droplet 12 closest to the pressure actuator, such that the pressure differential between the gas on either side of the droplet 12 moves the droplet to a desired location along the length of the fiber 10.

An optical input/output device 20 transmits light into the second end 18 of the hollow core photonic bandgap fiber 10. The light is guided along the central core of the hollow core photonic bandgap fiber 10 until it reaches the reflective mirror-like surface of the liquid metal droplet 12. The reflective surface reflects the light back along the central core of the optical fiber toward the fiber input/output device.

In the example shown in FIG. 2B, the input optical signal and the delayed output optical signal are separated by a fiber optic circulator 24, although other devices such as optical couplers can also be suitable in some applications.

A length of optical fiber 24 can be positioned between the fiber optic circulator 20 and the end 18 of the hollow core photonic bandgap fiber 10, to transmit the source light to the fiber 10 and to transmit the reflected light back to the fiber optic circulator 20. In an exemplary embodiment, the optical fiber 24 is a single mode fiber with one end spliced or otherwise optically coupled to the end of the hollow core photonic bandgap fiber 10, and the other end of the optical fiber 24 optically coupled to the fiber optic circulator 20. The length of optical fiber 24 provides additional time delay in the system.

The optical fiber 24 preferably has a core size that is well-matched to the size of the light-guiding region of the hollow core photonic bandgap fiber, in order to minimize losses when light is transmitted between the optical fiber 24 and the hollow core fiber 10.

FIG. 2C shows a cross sectional view of a hollow core photonic bandgap fiber 10 with the droplet 12 within the hollow core.

The reflective surface of the droplet 12 reflects the light propagating along the fiber core back towards its source. In this example, input light passes through the optical circulator 24. Because the droplet is formed of liquid, its position can be easily controlled within the core of the hollow core fiber 10. Translation of the reflective droplet 12 alters the round-trip optical path length of the light introduced into the end of the hollow core fiber, or equivalently, alters the round-trip phase and group delay of the light introduced into the end of the hollow core fiber.

The small size of the droplet 12 allows the droplet to be actively or passively repositioned within the hollow core fiber 10. This produces a translatable, fiber-optic mirror.

An advantage of the liquid metal fiber mirror is that it allows the mirror's position to be varied over a wide range without the use of free-space optics. The droplet of the liquid metal mirror can be translated most of the length of the hollow core fiber. The position of the droplet can be monitored and the droplet can be repositioned as needed via a feedback control system. The system could also be calibrated to set upper and lower limits for the pressure actuator, so the upper limit corresponds to a position close to the far end of the hollow core fiber and the lower limit corresponds to a position near the near end of the hollow core fiber. The droplet can be liquid metal, such as mercury, indium, gallium, or mixtures thereof, or a liquid suspension (e.g., water or oil) containing a reflective nanoparticle. The particles cold be metallic, for example, gold or silver. The reflective droplet could also be a ferrofluid, that is, a fluid with iron nanoparticles. The position of such a reflective droplet of ferrofluid could be controlled by a magnetic field or could be controlled by the other actuators discussed herein.

The hollow core fiber 10 can be coiled on a spool, so that long-distance mirror translation, over the range of meters and beyond, can be achieved in a compact fiber package.

In one example, the droplet is approximately 25 µm long and the hollow core has a diameter of 9 µm. The droplet can be in the range of about or between about one to ten times the core diameter, or preferably between about two to three times the core diameter. A small droplet can be more responsive to the actuator force, requiring less energy to reposition. A small droplet also allows the droplet to be moved a longer distance along the fiber core than is feasible with a larger droplet, so the hollow core fiber can be longer and the time delay greater for a smaller droplet. A larger droplet, however, can provide more positional stability for the droplet in instances in which vibration or other high frequency environmental effects are expected.

In the following example, a fiber-optic true time delay device is demonstrated to provide a continuously-variable optical path length of over 3.6 meters, without the use of free-space optics or optical-resonance techniques (i.e. "slow light"). This change in path length corresponds to a continuously-variable true-time delay of over 12 ns, which for a 10 GHz modulated signal amounts to 120 periods of tunable delay.

Figure 3:
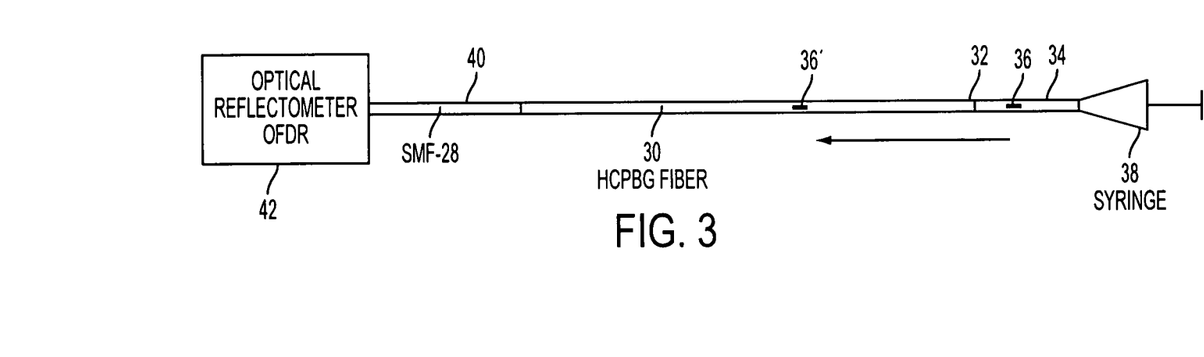
FIG. 3 shows a method for introducing the mercury droplet into the hollow core photonic bandgap fiber.

In this example, and as seen in FIG. 3, a hollow-core photonic bandgap fiber 30 with a 10 μm (10 micron core diameter, a 9 μm mode field diameter (MFD), and 1.49-1.68 μm wavelength transmission range was cleaved at both ends to a length of approximately 2.0 meters. The hollow core photonic bandgap fiber is commercially available as fiber model HC-1550-02 from NKT Photonics A/S, a company headquartered in Birkerod, Denmark. One end 32 of the HCPBG fiber was then placed against the cleaved end of a 15 μm inner diameter fused silica capillary tube 34, which had been filled with a 25 μm-long droplet 36 of electronics grade mercury. In this example, the mercury was commercially available 99.999995% purity mercury supplied by Alfa Aesar, a company headquartered in Ward Hill, Mass., USA.

The mercury droplet 36 was then transferred into the core of the HCPBG fiber 30 by applying air pressure to the other end of the capillary tube with a syringe 38. As seen in FIG. 3, the mercury droplet is designated as 36' to show its new position within the hollow core fiber. This step relies on the tendency for mercury not to wet a fused silica surface, a property analogous to hydrophobicity, as discussed in J. N. Israelachvili, Intermolecular and Surface Forces, $3^{rd}$ Ed. (Academic Press 2011). This reverse capillary pressure inhibits the mercury from filling the smaller tubes of the HCPBG fiber cladding. The resulting capillary pressure, which scales inversely with tube diameter, was significantly larger for the 3.8 μm holes of the cladding as compared to the 10 μm fiber core, thus allowing the fiber core to be preferentially filled. This step was also assisted by the high surface tension of the droplet.

Figure 4:
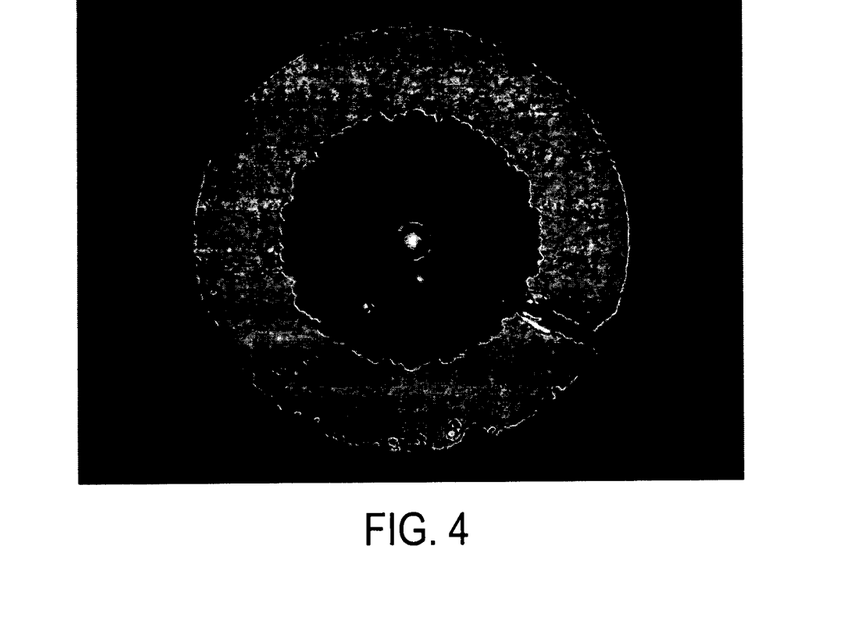
FIG. 4 shows a microscope image of the hollow core photonic bandgap fiber cross-section, cleaved at a point where mercury fills the fiber core.

FIG. 4 shows a microscope image of the HCPBG fiber cross-section, cleaved (for a larger droplet after testing) at a point where the mercury droplet is positioned withing the core of the hollow core photonic bandgap fiber 30. FIG. 4 illustrates that the mercury was present within the fiber's hollow core, but not within the surrounding air-filled holes in the cladding.

Figure 5:
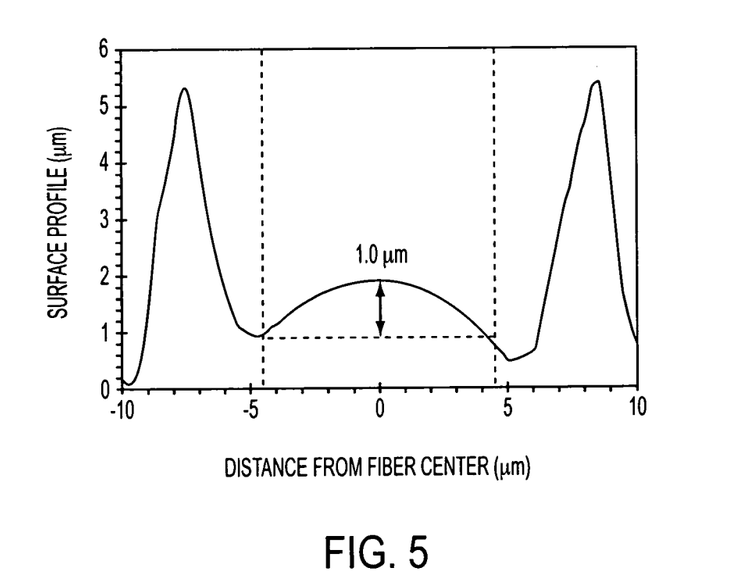
FIG. 5 shows the surface profile of the mercury-air interface (meniscus) within the HCPBG fiber, as optically profiled using a scanning confocal microscope.

FIG. 5 shows the surface profile of the mercury-air interface (meniscus) within the HOLLOW CORE fiber, as optically profiled using a scanning confocal microscope. This surface profile demonstrates that the mercury-air interface was flat to within 1.0 μm over the 9 μm mode field diameter of the fiber, with the mode field diameter indicated by vertical dashed lines. The meniscus varied by approximately 1.0 μm within the mode field diameter. Ideally, the mirror surface should be flat to maximize reflection into the guided mode of the HOLLOW CORE fiber. Thus, some optical loss at the air-mercury interface is expected due to inter-modal coupling caused by the slight curvature of the meniscus as shown in FIG. 5.

Figure 6:
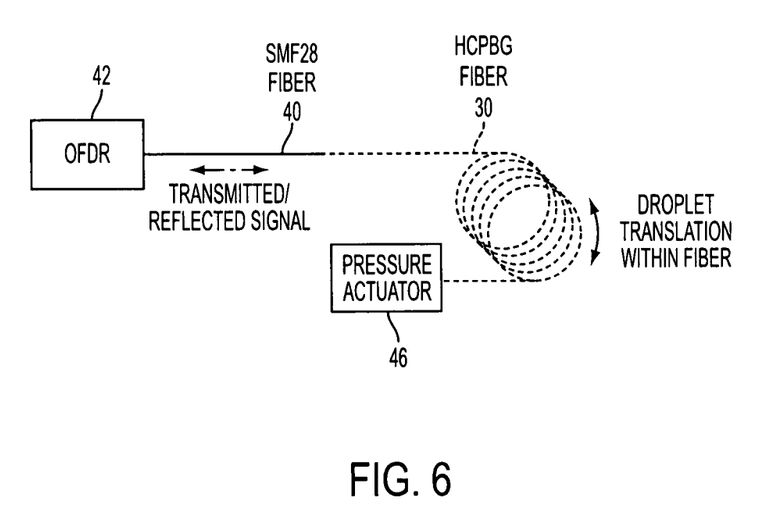
FIG. 6 shows a test set up used for translating the reflective droplet within the hollow core photonic bandgap fiber and measuring the optical reflectivity of the reflective droplet.

FIG. 6 shows a test set up used for translating the reflective droplet within the HOLLOW CORE fiber 30 and characterizing its motion by measuring the optical reflectivity of the liquid metal fiber mirror. The hollow core photonic band gap fiber 30 was butt-coupling to a flat cleaved single mode fiber 40 (Corning's SMF28 fiber), and the reflectivity at a 1.55 μm wavelength was measured with an OFDR. A fiber-coupled, multi-mode laser with 0.8 mm coherence length was used for this measurement, in order to eliminate cavity interference between the reflections from the SMF28 end face and the liquid metal surface. This allowed the device reflectivity to be measured, defined by the expression $$R_d = \frac{P_m}{P_{in}} = \frac{P_t - P_f}{P_{in}},$$

where $P_{in}$ is the power launched into the SMF28 fiber 40, $P_f$ is the returned power from the fiber-fiber interface, $P_m$ is the returned power from the air-mercury interface, and $P_t = P_f + P_m$. Using this method, the device reflectivity was measured to be −10.9 dB when the mercury droplet was located 12 cm from the fiber-fiber interface. However, after accounting for 1.5 dB of fiber-to-fiber coupling loss per pass (estimated from transmission measurements of an empty hollow core photonic bandgap fiber), the reflectivity of the liquid metal mirror into the guided mode of the fiber was estimated to be −7.9 dB. Assuming a reflectivity of mercury is 80% at 1.55 μm (based on T. Inagaki et al, "Optical Properties of Liquid Mercury," Phys. Rev. B 23, 5246-5262 (1981), the majority of the optical loss at the mirror, 6.9 dB, was attributable to the curvature of the meniscus.

It may be possible to control the meniscus curvature by methods described in: A. H. Ellison et al, "Contact angles of mercury on various surfaces and the effect of temperature," J. Chem. Eng. Data, 12, 607-609 (1967); M. Stepanova and S. Dew, Nanofabrication: Techniques and Principles, (Springer 2011); S. Usui and T. Yamasuki, "Adhesion of mercury and glass in aqueous solutions," J. Colloid and Interface Science, Vol. 29, pp. 629-638 (1968); and T. Tsukamoto et al, "Long working range mercury droplet actuation," J. Micromech. Microeng., Vol. 19, page 094016 (2009).

As mentioned above, the input end of the fiber mirror was butt-coupled to a SMF28 fiber, which was in turn connected to an optical frequency-domain reflectometer (OFDR). Here, the "fiber mirror" includes the hollow core fiber with the reflective droplet within its hollow core. The flat-cleaved ends of the hollow core photonic bandgap and SMF28 fibers were then manually aligned to maximize the reflection from the liquid metal droplet, discernible at the end of the hollow core fiber using the OFDR. The droplet was then pushed along the HCPBG fiber by applying air pressure with a piston-type pressure actuator 46 attached to the end of the hollow core fiber, while the position of the mirror reflection point (air-liquid metal interface) was monitored using the OFDR 42. Measurements were performed over the wavelength range 1.525 to 1.613 μm, which covered the C-band and most of the L-band. The 2.0 m hollow core fiber was coiled on a 1.0 inch diameter spool during measurements, with a total volume of less than 1 cubic inch.

Figure 7:
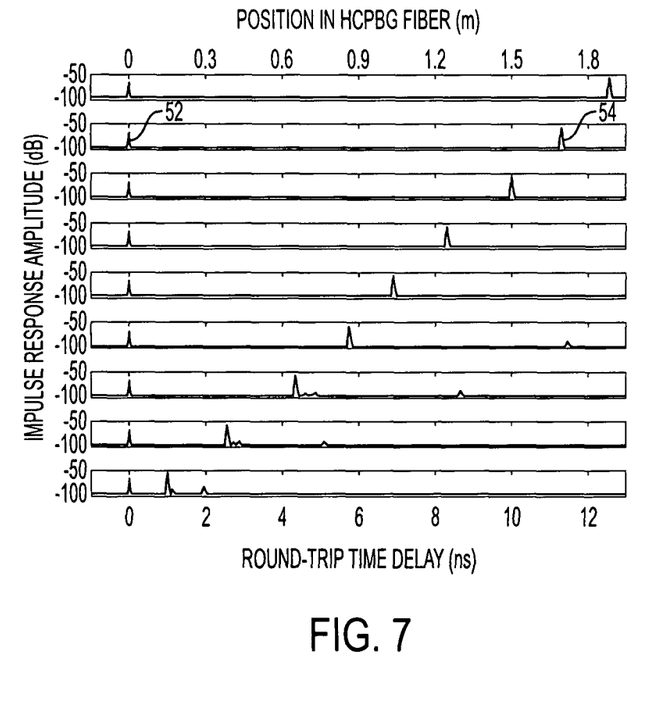
FIG. 7 shows optical frequency domain reflectometry scans recorded at different times as the liquid metal droplet was translated along the central hollow core of the hollow core photonic bandgap fiber.

FIG. 7 shows nine OFDR scans recorded at different times as the liquid metal droplet was translated along the hollow core photonic bandgap fiber. Each scan corresponds to a different position of the liquid metal droplet as it was it was pushed along the hollow corefiber by the pressure actuator 46.

In each scan, the reflection from the SMF28-to-HCPBG fiber interface, located at the horizontal axis origin, serves as a reference. Each scan plots the amplitude of the optical impulse response versus position along the fiber, with position derived from the measured group delay assuming an effective mode refractive index of 1.00 for the hollow core photonic bandgap fiber, based on the datasheet for the particular hollow core bandgap fiber, which in this example is NKT Photonics data sheet, "HC-1550-02 hollow-core photonic bandgap fiber" (NKT Photonics 2012). The location of the air-liquid metal interface (i.e. mirror reflection point) is indicated by second reflection peak from the left. This interface was translated 1.8 m along the HCPBG fiber, producing a round-trip true time delay tuning range of 12 ns.

Using one scan as an example, the reflection from the SMF28-to-HCPBG fiber interface, located at the origin 52 of the horizontal axis, serves as a reference. The second reflection peak 54 from the left corresponds to the location of the air-liquid metal interface within the HCPBG fiber. As shown, this interface was translated a distance of 1.8 m along the fiber by applied air pressure.

Figure 8:
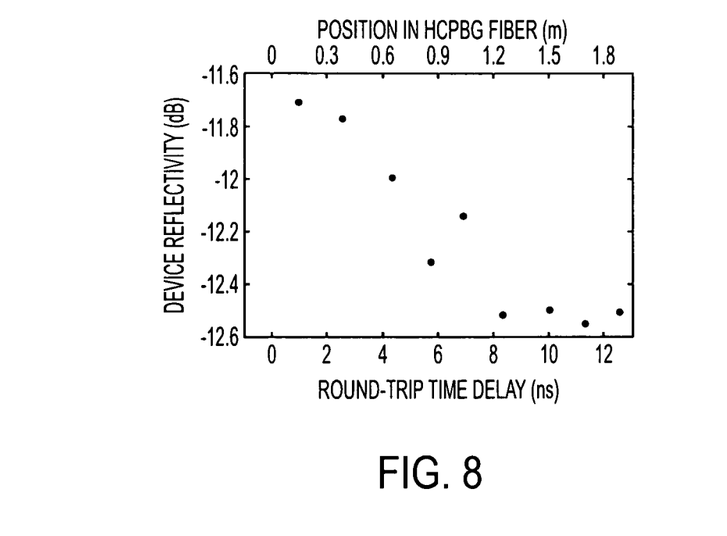
FIG. 8 shows the device reflectivity versus position of the liquid metal mirror within the HCPBG fiber.

FIG. 8 shows the device reflectivity versus position of the liquid metal mirror within the HCPBG fiber. The device reflectivity decreased with distance from the SMF28-to-HCPBG interface (the horizontal origin), presumably due to attenuation of leaky modes excited in the HCPBG fiber. The device reflectivity stabilized at a distance of approximately 1.2 m from the fiber-fiber interface.

This 1.2 meter distance provided a continuously-variable round-trip optical path length of 3.6 m, or equivalently, a continuously-variable round-trip true-time-delay of 12 ns. By applying reverse pressure the liquid metal droplet could also translated in the opposite direction.

The impulse response measured by the OFDR, shown in FIG. 6, is related to the optical reflectivity via a Fourier transform relationship. Transforming the impulse response data in FIG. 7, using data only in the vicinity of the air-liquid metal interface, produces the device reflectivity values plotted in FIG. 8. As shown, the device reflectivity tended to decrease with distance from SMF28-to-HCPBG fiber interface, decreasing by approximately 0.9 dB until stabilizing at a distance of 1.2 m from the fiber-fiber interface. This variation with position is believed to be due to the excitation of leaky modes in the HCPBG fiber, which attenuated over a distance of approximately one meter.

Figure 9A:
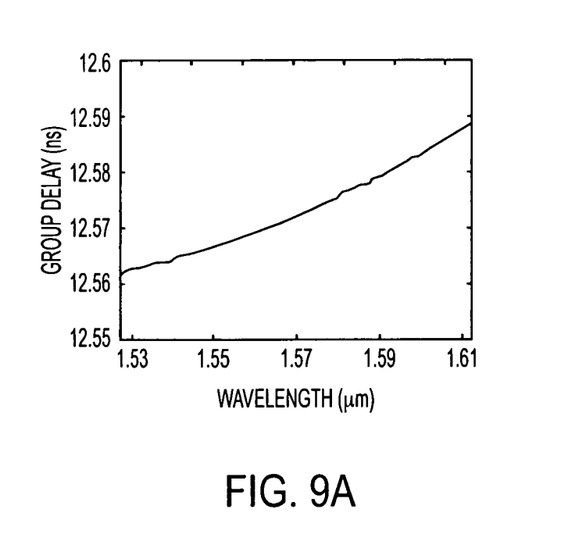
FIG. 9A and FIG. 9B show the group delay and the device reflectivity vs. wavelength, when the liquid metal mirror was located 1.89 m from the SMF28-HCPBG fiber interface.
Figure 9B:
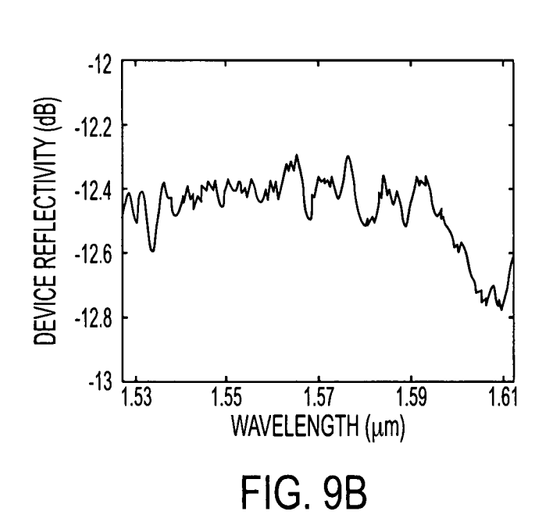

FIG. 9A and FIG. 9B show the group delay and the device reflectivity vs. wavelength, when the liquid metal mirror was located 1.89 m from the SMF28-to-HCPBG fiber interface. Note that the data has been smoothed using a 1.0 nm window to reduce noise. The group delay appears to be relatively wavelength independent, varying by only 0.24% over the entire 88 nm measurement range. The device reflectivity is also relatively wavelength independent, varying by approximately 0.3 dB over a 70 nm wavelength range.

Figure 10:
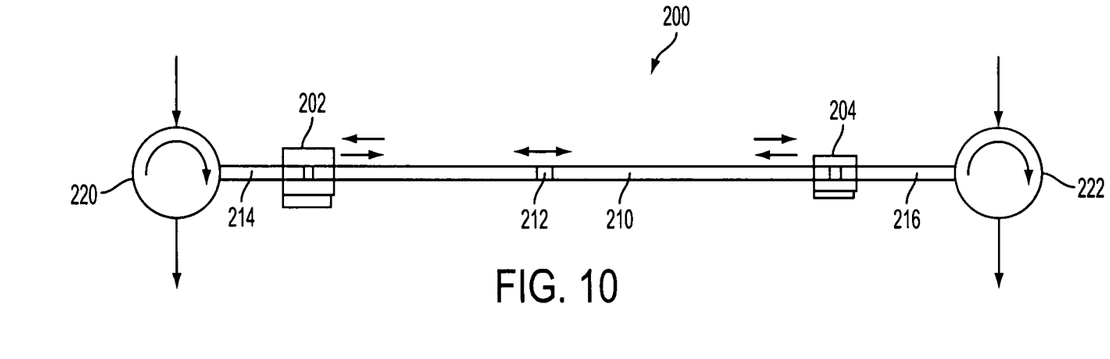
FIG. 10 shows another example of a time delay system in which two optical signals enter the time delay system at different ends of the waveguide and are delayed by the same reflective droplet.

FIG. 10 illustrates an example of a true time delay system 200 using similar or identical materials and components described above, but in which two pressure actuators are used. One pressure actuator 202 is located at one end of the hollow core photonic bandgap fiber 210, and the other pressure actuator 204 is located at the opposite end of the hollow core photonic bandgap fiber 210. A droplet of reflective liquid 212 is positioned in the hollow core photonic bandgap optical fiber's hollow core between the locations of the pressure actuators. Light can enter the hollow core photonic bandgap optical fiber from either or both ends of the fiber. The hollow core photonic bandgap fiber 210 can be coupled at each end to a single mode fiber 214, 216, which receives light from and returns reflected light to the optical circulators 220 and 222 or other optical coupling devices. The light is reflected by the reflective droplet back toward the same end of the optical fiber it entered. One of the pressure actuators can increase the gas pressure on one side of the droplet, while the other pressure actuator reduces the gas pressure through suction on the opposite side of the droplet. When the reflective droplet is centrally located, the optical path lengths seen by signals from each end of the system can be the same, so each experiences the same time delay. However, by moving the droplet in one direction or the other, one path length is increased and the other path length is decreased by an equal amount. This system 200 can therefore form the two arms of an optical interferometer, for example, as it can provide two optical signals with different time delays, or can apply two different time delays to the same optical signal as the signal passes through two parallel but unequal optical paths.

In each of the examples above, the actuator can be a different type than the pressure actuator discussed herein. For example, the actuator can be an electrostatic type actuator that acts directly on the metallic droplet.

The systems described herein can provide translatable fiber-optic mirrors that are based on the motion of liquid metal through the hollow core of a hollow core optical fiber. By moving a liquid metal mirror within the hollow core of an optical fiber, large, continuous changes in optical path length are achieved in a comparatively small package. The fiber optic device can provide a continuously-variable optical path length of over 3.6 meters. This change in path length corresponds to a continuously-variable true-time delay of over 12 ns, or 120 periods at a 10 GHz modulation frequency. Wavelength dependence was shown to be negligible across the C and L bands.

The ability to continuously-tune a TTD over many RF periods offers considerable potential for enabling high-resolution, reconfigurable optical-domain signal processing and beam-forming systems.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. A true time delay system for optical signals, comprising:
   a hollow core optical fiber;
   a droplet of reflective liquid metal disposed in the hollow core; and
   a pressure actuator coupled to a first end of the hollow core optical fiber configured to change a position of the droplet within the hollow core;
   a single mode fiber optically coupled to a second end of the hollow core optical fiber; the second end of the hollow core optical fiber configured to receive optical energy, to transmit the optical energy through the hollow core toward the reflective droplet, and to return the reflected optical energy toward the second end of the hollow core optical fiber.

2. The true time delay system according to claim 1, wherein the hollow core optical fiber is a hollow core photonic bandgap fiber.

3. The true time delay system according to claim 2, wherein holes in the hollow core photonic bandgap fiber cladding surrounding the hollow core are substantially free of the reflective liquid.

4. The true time delay system according to claim 1, wherein the droplet is mercury.

5. The true time delay according to claim 1, further comprising an optical circulator optically coupled to an end of the hollow core optical fiber for separating input optical signals and output time-delayed optical signals.

6. The true time delay system according to claim 1, wherein the droplet has a length along the core of the hollow core optical fiber of between about two core diameters and three core diameters.

7. The true time delay system according to claim 1, wherein the droplet has a length along the core of the hollow core optical fiber of between one core diameter and about ten core diameters.

8. A true time delay system for optical signals, comprising:
a hollow core photonic bandgap optical fiber;
a droplet of reflective liquid metal disposed in a hollow core of the hollow core optical fiber;
an actuator coupled to at least a first end of the hollow core optical fiber to introduce gas into or remove gas from the hollow core at a near side of the droplet, thereby increasing or decreasing a gas pressure at the near side of the droplet and changing a position of the droplet within the hollow core;
a single mode fiber optically coupled to a second end of the hollow core photonic bandgap optical fiber, the second end of the hollow core photonic bandgap optical fiber configured to receive optical energy from outside the hollow core photonic bandgap optical fiber, to transmit the received optical energy through the hollow core toward the reflective droplet, and to return the reflected optical energy toward the second end of the hollow core optical fiber.

9. The true time delay according to claim 8, further comprising an optical circulator optically coupled to an end of the hollow core photonic bandgap optical fiber for separating input optical signals and output time-delayed optical signals.

10. The true time delay system according to claim 8, wherein holes in the hollow core photonic bandgap fiber cladding surrounding the hollow core are substantially free of the reflective liquid.

11. The true time delay system according to claim 8, wherein the droplet has a length along the core of the hollow core optical fiber of between about two core diameters and three core diameters.

12. The true time delay system according to claim 8, wherein the droplet has a length along the core of the hollow core optical fiber of between one core diameter and about ten core diameters.

13. The true time delay system according to claim 8, wherein the pressure actuator is in contact only with the first end of the hollow core photonic bandgap optical fiber.

\* \* \* \* \*